US012522440B2

(12) United States Patent
Hoffman et al.

(10) Patent No.: US 12,522,440 B2
(45) Date of Patent: Jan. 13, 2026

(54) RECEPTACLE WITH TEMPERATURE CONTROLLED LID FOR AUTOMATED STORAGE AND RETRIEVAL SYSTEM

(71) Applicant: Dematic Corp., Grand Rapids, MI (US)

(72) Inventors: Stephen E. Hoffman, Grand Rapids, MI (US); William R. Boer, Wayland, MI (US); Matthew Inbody, Grand Rapids, MI (US); Alexander Dale, Etobicoke (CA)

(73) Assignee: Dematic Corp., Grand Rapids, MI (US)

( * ) Notice: Subject to any disclaimer, the term of this patent is extended or adjusted under 35 U.S.C. 154(b) by 529 days.

(21) Appl. No.: 18/161,459

(22) Filed: Jan. 30, 2023

(65) Prior Publication Data

US 2023/0242345 A1 Aug. 3, 2023

Related U.S. Application Data

(60) Provisional application No. 63/304,946, filed on Jan. 31, 2022.

(51) Int. Cl.
*B65G 1/137* (2006.01)
*F25D 11/00* (2006.01)
*G05B 15/02* (2006.01)

(52) U.S. Cl.
CPC .......... *B65G 1/1378* (2013.01); *F25D 11/003* (2013.01); *G05B 15/02* (2013.01)

(58) Field of Classification Search
CPC ... B65G 1/1378; B65G 1/0421; F25D 11/003; F25D 15/00; F25D 17/06; G05B 15/02
See application file for complete search history.

(56) References Cited

U.S. PATENT DOCUMENTS 8,983,647 B1 * 3/2015 Dwarakanath ....... G05D 1/0297
700/216
10,819,126 B2 10/2020 Hognaland et al.
(Continued)

FOREIGN PATENT DOCUMENTS

CN 110884819 A 3/2020
EP 3844084 A2 7/2021
(Continued)

OTHER PUBLICATIONS

Salah et al., "IoT-Enabled Shipping Container with Environmental Monitoring and Location Tracking" 2020 IEEE 17th Annual Consumer Communications & Networking Conference (CCNC), Las Vegas, NV, USA, 2020, p. 1-6, doi:10.1109/CCNC46108.2020. 9045495. URL: <https://www.researchgate.net/publication/340228896_IoT-Enabled_Shipping_Container_with_Environmental_Monitoring_and_Location_Tracking> Entire Document.
(Continued)

*Primary Examiner* — Kyle O Logan
(74) *Attorney, Agent, or Firm* — Gardner, Linn, Burkhart & Ondersma LLP

(57) ABSTRACT

An automated warehouse system and method are provided for controlling internal microclimates of totes within a warehouse or order fulfilment facility. The system provides independent environmental condition monitoring and regulation for each tote. The system enables individual totes to be maintained at adequate or substantially ideal conditions, independent of its position within a storage system or the environmental conditions of adjacent totes. The storage system includes environmental control inputs at individual storage locations to adjust or maintain environmental conditions within a tote at a particular storage location. The totes engage the environmental control inputs when they are stored at a storage location. The system may utilize standard or commercially available totes. The system is operable to
(Continued)

monitor and control the microclimate of a tote while it is stored at a storage location and may be operable to monitor the totes while they travel throughout the system.

20 Claims, 3 Drawing Sheets

(56) References Cited

U.S. PATENT DOCUMENTS

| | | | | |
|---|---|---|---|---|
| 11,685,588 | B2* | 6/2023 | Fosnight | B65D 51/28 |
| | | | | 220/592.02 |
| 11,897,689 | B2* | 2/2024 | Pai | B65D 81/18 |
| 2006/0053825 | A1 | 3/2006 | Owen et al. | |
| 2010/0310344 | A1* | 12/2010 | Hinnen | G07F 17/0092 |
| | | | | 414/273 |
| 2011/0202170 | A1 | 8/2011 | Dawes et al. | |
| 2013/0166060 | A1* | 6/2013 | Irwin | G07F 7/08 |
| | | | | 700/214 |
| 2014/0058554 | A1* | 2/2014 | Janet | G07F 11/64 |
| | | | | 700/214 |
| 2016/0031644 | A1 | 2/2016 | Schubilske | |
| 2017/0261237 | A1 | 9/2017 | High et al. | |
| 2018/0249861 | A1 | 9/2018 | Hiatt et al. | |
| 2018/0252460 | A1 | 9/2018 | Malin | |
| 2020/0005229 | A1* | 1/2020 | Durkee | B65G 1/06 |
| 2020/0071076 | A1* | 3/2020 | Fosnight | G05D 1/0276 |
| 2020/0166267 | A1 | 5/2020 | Boer et al. | |
| 2020/0216253 | A1* | 7/2020 | Tanabe | B65D 81/3823 |
| 2020/0317445 | A1 | 10/2020 | Schultz et al. | |
| 2020/0393186 | A1* | 12/2020 | Horii | F25D 17/045 |
| 2021/0199353 | A1 | 7/2021 | Edwards et al. | |
| 2021/0300664 | A1 | 9/2021 | Fosnight et al. | |
| 2022/0154992 | A1* | 5/2022 | Siddiqui | F28D 20/021 |
| 2023/0267404 | A1* | 8/2023 | Villalobos | B65D 88/745 |
| | | | | 705/332 |

FOREIGN PATENT DOCUMENTS

| | | |
|---|---|---|
| JP | 2009050076 A | 3/2009 |
| WO | 2016166354 A1 | 10/2016 |
| WO | 2021148642 A1 | 7/2021 |

OTHER PUBLICATIONS

International Search Report and Written Opinion from corresponding Patent Cooperation Treaty (PCT) Application No. PCT/IB2023/050806, completed Mar. 21, 2023.
Extended Search Report from corresponding European patent application No. 23746582.8, dated Oct. 8, 2025.

* cited by examiner

RECEPTACLE WITH TEMPERATURE CONTROLLED LID FOR AUTOMATED STORAGE AND RETRIEVAL SYSTEM

CROSS REFERENCE TO RELATED APPLICATION

The present application claims priority of U.S. provisional application Ser. No. 63/304,946 filed Jan. 31, 2022, which is hereby incorporated herein by reference it its entirety.

FIELD OF THE INVENTION

The present invention is directed to automated storage systems, and in particular temperature and environmentally controlled storage systems.

BACKGROUND OF THE INVENTION

Many consumer products require specialized environments for warehousing and storage. Automated storage and retrieval systems take full advantage of building height by using various lift, transport and storage mechanisms and technology to increase the number of locations, and quantity of items that can be stored by maximizing the available cube of the building. Different goods and items have different climate and environmental control requirements and typical automated storage and retrieval equipment commonly store all items requiring a specialized storage environment in a large area or environment that is suited for those types of good. For example, frozen items are typically stored in automated storage and retrieval systems within a freezer building or self-contained freezer compartment within a larger building. Accordingly, it is common for vertical space in warehouses and distribution centers to be underutilized because the specialized areas or environments for particular groupings of goods are often too large or only occasionally filled to capacity.

SUMMARY OF THE INVENTION

The present invention provides an automated warehouse system with an automated storage and retrieval solution that includes independent and/or individually climate-controlled storage receptacles or totes and a method for monitoring and controlling the microclimate within each tote. A microclimate is the climate of a very small or restricted area (e.g. an individual tote), especially when this differs from the climate of the surrounding area (e.g. a surrounding storage system). The system includes a warehouse control system that is operable to control the microclimates of each tote as well as storage, decant, and order fulfilment operations of goods within the facility. The system is well suited for operation within an ambient environment, thereby substantially reducing or eliminating strain on both equipment and workers that is commonly experience in low temperature settings and other harsh environment, such as low oxygen environments. The system may utilize commonly known and commercially available totes for storing temperature dependent goods while maintaining each tote in the storage system at its own, independently controlled microclimate. For example, commercially available insulated totes may be utilized for environmentally controlled goods and non-insulated totes may be utilized for non-environmentally controlled goods, which may be stored in an ambient environment. The system provides flexibility as the microclimate environment inside each individual tote can be adjusted or completely altered without affecting the goods in other totes in the system.

In one form of the present invention, an automated warehouse system is provided for storing goods in receptacles with some or all of the receptacles being individually addressable such that they may be maintained with different environmental conditions as compared to adjacent receptacles stored in the system. A microclimate control device is provided at storage locations within the system based on the quantity of goods to be stored in the system that require environmental control. For example, if half of the goods to be stored in the system require environmental control, then half of the storage locations would be provided with microclimate control devices and the other storage locations would be provided without. The microclimate control device is fitted in a lid or cover for sealing the receptacles. The covers are attached to a portion of the storage system within the warehouse system and are provided at each storage location. The storage system may be adapted to provide environmental control for more or fewer of the storage locations, such as in the event that the projected storage requirements within the system change. In other words, the microclimate control devices may be readily coupled and/or de-coupled from the storage system to provide more or fewer environmentally controlled storage locations. Optionally, standard, non-insulated totes may be stored at environmentally controlled storage locations having microclimate control devices. For example, the microclimate control device may be disabled while a non-insulated tote is present within the corresponding storage location.

The microclimate control devices are in communication with a control system of the warehouse such that the control system may monitor and manage the interior microclimate of each individual storage receptacle. The system may utilize receptacles that are commonly known, such as commercially available insulated totes without lids. The system and method are particularly beneficial in that they are energy efficient because environmental control (e.g. cooling) is focused on each individual receptacle as opposed to an entire room housing a storage system. The environmental controls may be deactivated automatically when receptacles are not present at a particular storage location in the system. The system does not require any special treatments for the warehouse. For example, the floor does not require special insulation or require a heating element to prevent the floor from frosting. The system and method optimize the transport of the receptacles such that they are only without environmental control for a minimal time period. For example, the time out of environmental control may be comparable or shorter than when a shopper has goods in their cart at a grocery store.

In one configuration in accordance with the present invention an automated warehouse system for storage of goods at different temperatures and having a warehouse control system controlling the system comprises an automated storage and retrieval system comprising a storage rack defining a plurality of storage locations, a plurality of storage receptacles configured to be stored at storage locations in the storage rack, and a storage receptacle cover coupled to the storage rack at at least some of the storage locations, where each of the receptacle covers is selectively operable to cover an open portion of one of the storage receptacles present at a particular one of the storage locations. A microclimate control device is coupled with each of the receptacle covers and is operable to monitor and regulate environmental conditions within a storage receptacle covered by a corresponding receptacle cover, with each of the microclimate control devices being individually controllable by the warehouse control system. The warehouse control system is thus operable to control each of the microclimate control devices to maintain and adjust the environmental conditions of corresponding ones of the storage receptacles stored in the rack such that the environmental conditions of storage receptacles covered with one of the receptacle covers can be maintained and adjusted at different levels.

In particular embodiments, the automated warehouse system further comprises a communication network disposed throughout the automated storage and retrieval system that is in communication with each of the microclimate control devices at each of the storage locations, where the warehouse control system is operable to adjust the environmental conditions of each of the storage receptacles via a connection between the communication network and each of the microclimate control devices.

The receptacle covers may be operable to be raised and lowered relative to storage receptacles stored at corresponding storage locations to selective cover and uncover an upper opening portion of the storage receptacles. Alternatively, the receptacle covers may remain stationary and be configured to slideably receive storage receptacles.

In another configuration in accordance with the present invention, a storage rack and control system for storage of goods at different temperatures includes a storage rack defining a plurality of storage locations, a plurality of storage receptacles configured to be stored at storage locations in the storage rack, and a plurality of storage receptacle covers coupled to the storage rack at at least some of said storage locations. Each of the storage receptacle covers is selectively operable to cover an open portion of one of the storage receptacles when present at a storage locations, with each storage receptacle cover including a microclimate control device operable to monitor and regulate environmental conditions within a storage receptacle covered by the corresponding receptacle cover, and wherein each of the microclimate control devices are individually controllable by the control system. The control system is thus operable to control each of the microclimate control devices to maintain and adjust the environmental conditions of corresponding storage receptacles stored in the rack such that the environmental conditions of storage receptacles covered with the receptacle covers can be maintained and adjusted at different levels.

A method for controlling microclimates inside of individual storage receptacles within an automated warehouse system in accordance with a further aspect of the present invention comprises storing a plurality of storage receptacles in an automated storage and retrieval system having a plurality of storage locations, where receptacle covers are coupled to the automated storage and retrieval system at the storage locations and are configured to cover a storage receptacle when located at the corresponding location. The receptacle covers comprise a microclimate control device that is operable to monitor and regulate environmental conditions within the corresponding storage receptacle. The method further comprise covering storage receptacles with respective receptacle covers at storage locations when the storage receptacles arrive at the particular storage locations, monitoring the environmental conditions within each of the storage receptacles with a warehouse control system that is operable to individually control each of the microclimate control devices via a communication network disposed throughout the automated storage and retrieval system, regulating the environmental conditions within particular ones of the storage receptacles if the storage receptacles require adjustment to meet the requirements of the goods stored within that storage receptacle, and uncovering selected storage receptacles when the selected storage receptacles are to be removed from the particular storage location.

These and other objects, advantages, purposes and features of this invention will become apparent upon review of the following specification in conjunction with the drawings.

DESCRIPTION OF THE PREFERRED EMBODIMENTS

Figure 1:
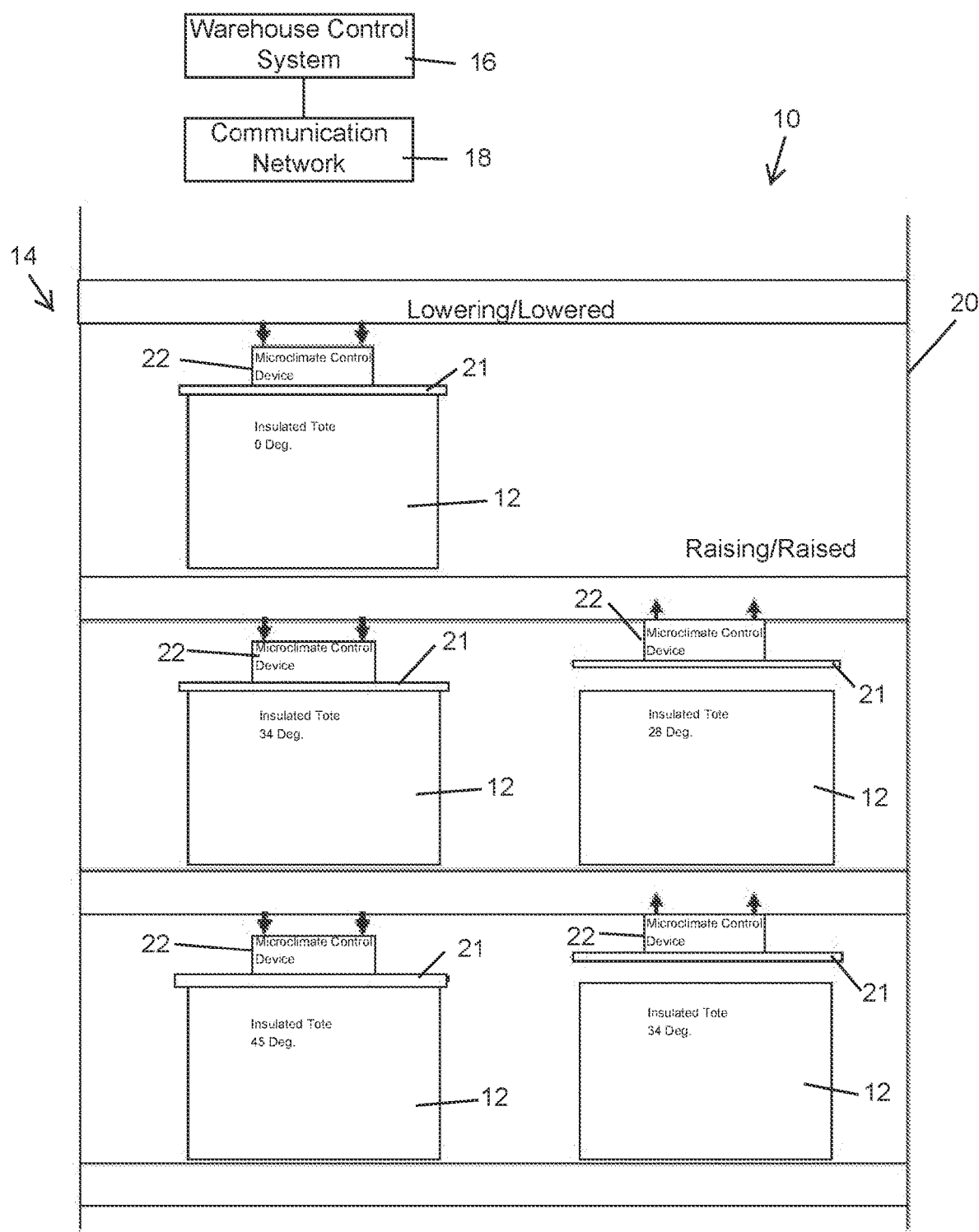
FIG. 1 is an elevation view of an automatic storage and retrieval system of an automated warehouse system for controlling microclimates of individual storage receptacles, in accordance with the present invention.
Figure 2:
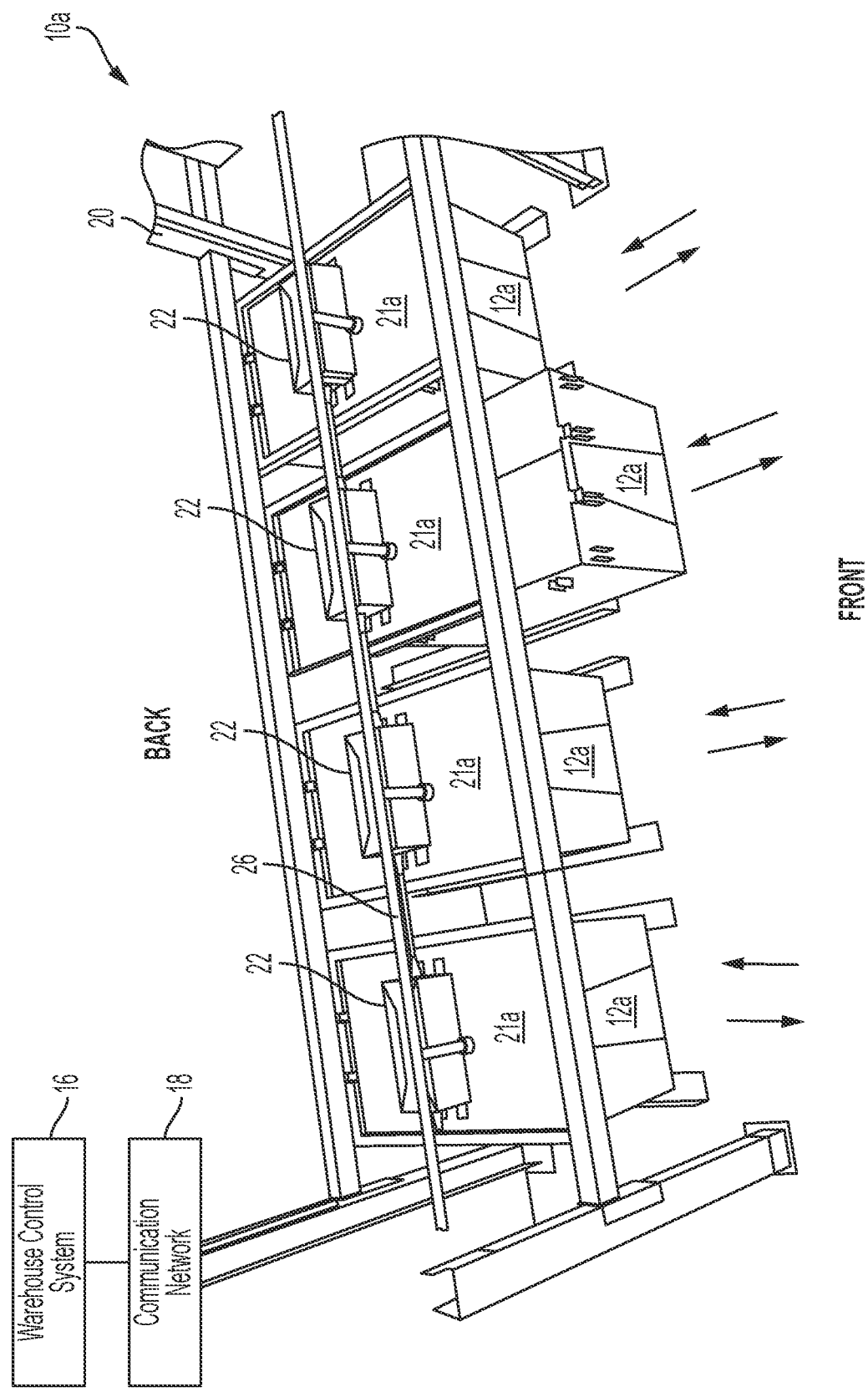
FIG. 2 is a perspective view of another automatic storage and retrieval system of an automated warehouse system for controlling microclimates of individual storage receptacles, in accordance with the present invention.
Figure 3:
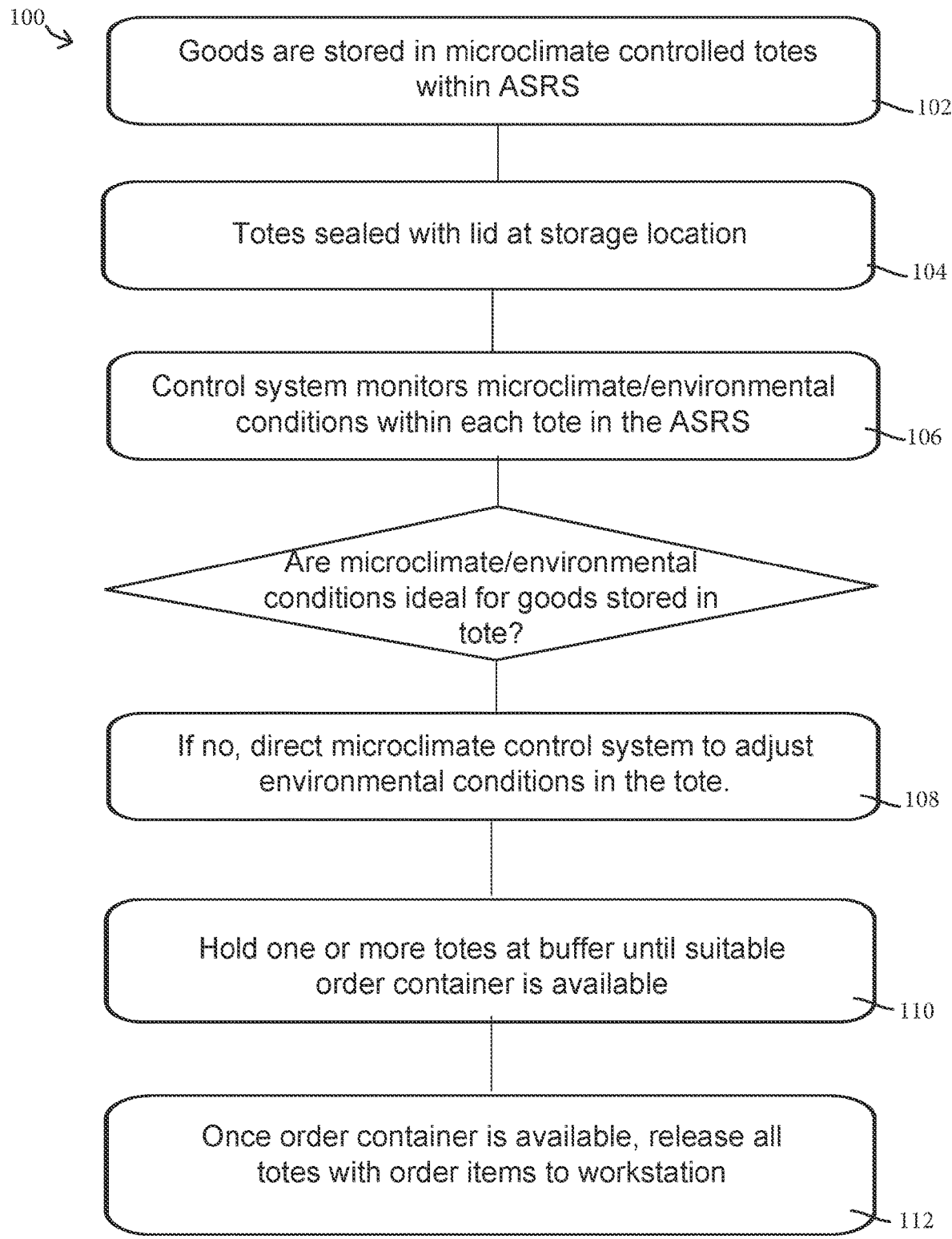
FIG. 3 is a diagram of a method for controlling the microclimate of individual storage receptacles within an automated warehouse system, in accordance with the present invention.

Referring now to the drawings and the illustrative embodiments depicted therein, an automated warehouse system 10 and method 100 are provided for actively monitoring and controlling or regulating the microclimate within an individual tote or receptacle 12 (FIGS. 1-3). The system 10 includes an automated storage and retrieval system (ASRS) 14 for storing, monitoring, controlling, and charging the totes 12. The system includes a warehouse control system 16 and a communication network 18 that is distributed throughout the system 10, such as a wired or wireless communication network. The system 10 and method 100 may be operable for both controlling the ASRS 14 as well as buffering totes 12 based on order fulfilment operation requirements of an order fulfilment workstation in communication with the ASRS 14. The system 10 and method 100 enable real-time monitoring of the environmental conditions within totes 12. Real-time monitoring enables the capture of key data elements as it pertains to the type and quantity of goods stored in a particular tote 12. Such data elements are utilized for real-time and active microclimate-control of each individual tote 12, which enables micro adjustment and regulation of the totes 12 to ensure that the goods within a particular tote are maintained at adequate or ideal environmental conditions. The system is well suited for use with typical, standard, or otherwise commonly known and commercially available totes, such as commercially available insulated totes, where as shown in the illustrated embodiments the totes are generally rectangular with sidewalls and a bottom and have an upper opening via which goods can be placed into and/or removed from an interior storage volume defined by the sidewalls and bottom. Utilizing standard totes enables maximum storage volume per receptacle without sacrificing storage volume, which is typically required for internal/on-board environmental controls systems that are built into the tote itself.

Referring now to the illustrative embodiment of FIG. 1, an automated warehouse system 10 is provided for the storage of goods at different temperatures within an order fulfilment facility. The system 10 includes an ASRS 14 having a storage rack 20 with multiple rack levels each having multiple storage locations for the storage of totes 12.

The ASRS 14 includes storage receptacle or tote lids or covers 21 coupled to a portion of the ASRS 14 at some or all of the storage locations, such as at the underside of a rack level or shelf of the storage rack 20, for example. Each of the tote covers 21 is operable to be placed over and to seal an open portion (e.g. an open top) of a tote 12 present at a particular one of the storage locations. A microclimate control device 22 is provided at each of the tote covers 21 to monitor and regulate environmental conditions within a tote 12 sealed by a corresponding tote cover 21. Because the microclimate control device is provided with the tote cover 21, no internal storage volume is sacrificed within the tote 12 for environmental control devices.

The ASRS 20 may optionally include two or more storage racks, with aisles between the storage racks and robotic shuttles operating in the aisles to store and retrieve the totes 12 from the storage locations. The ASRS 14 may include a lift for transporting totes 12 to the different levels of the storage rack 20. The lift also transfers items from the ASRS 14 to a downstream process, such as a conveyer in communication with an order fulfillment and/or decant workstation. The ASRS 14 may be located in an ambient environment, such as a warehouse facility without cold storage functionality, while some or all of the totes 12 are maintained at an appropriate internal temperature for the particular goods stored within. The system 10 utilizes commonly available and commercially known totes 12, e.g. insulated totes for environmentally controlled goods and non-insulated totes for good requiring no environmental control, which enables various functionalities within the system, including two deep storage, tote shuffling, and inter-aisle transfer. Further, the use of standard or typical totes results in substantially no loss of storage volume, as compared to commercially available individually temperature controlled totes having independent climate control system built-in, for example. Because the totes 12 are open at the top during transport within the system 10, they arrive at order fulfilment workstations (e.g. goods to person workstations) ready for an operator to select from the tote.

As depicted in the illustrative embodiment of FIG. 1, the tote covers 21 may be operable to raise and lower relative to the corresponding tote 12 at a corresponding storage location to seal and unseal the top opening of the tote 12. For example, a lifting mechanism, such as extendable and retractable arms or cylinders or the like, may be provided between the storage rack 20 and the tote cover 21 to lift the cover from the corresponding tote 12 once it is ready to be retrieved from the storage location. The lifting mechanism may be operable to lower the tote cover 21 about twenty-five to fifty millimeters (25-50 mm) onto the tote 12 to seal the top of the tote when the storage container is positioned in the storage location. When the tote 12 needs to be retrieved, the tote cover 21 raises about twenty-five to fifty millimeters (25-50 mm) to allow the tote to be retrieved, such as by a shuttle. Alternatively, as depicted in the illustrative embodiment of FIG. 2, a system 10*a* is provided that is similar in structure and function to the system 10 of FIG. 1 in many respects, but includes alternative tote covers 21*a* configured to slideably receive totes 12*a*. As such, the totes 12*a* may move laterally into and out of a storage location and be slideably received in the tote cover 21*a*. Similar to that described for system 10 above, a microclimate control device 22 is provided at each of the tote covers 21*a* of system 10*a*.

The system 10 may be adapted to provide environmental control functions at more or fewer of the storage locations based on the ratio or mix of goods planned or expected to be stored in the facility. A sufficient quantity of microclimate control devices 22 are provided at storage locations throughout the ASRS 14 to service the totes 12 requiring environmental controls while other storage locations may be provided without microclimate control devices for the storage on non-environmentally controlled good (i.e. goods storable in ambient environments). Additional microclimate control devices 22 and/or tote covers 21 may be provided in the event that environmental control requirements within the system 10 increase. The microclimate control devices 22 and/or tote covers 21 may be removed, repositioned, and/or disabled within the system 10 to reduce costs and improve efficiencies within the system 10. Preferably, insulated and non-insulated totes within the system have identical exterior shapes, dimensions, and configurations. In other words, the system 10 views the totes (i.e. insulated and non-insulated totes) as exteriorly agnostic or ubiquitous. As such, it is contemplated that non-insulated, non-environmentally controlled totes may be inserted or stored at a storage location having a tote cover 21 and microclimate control device 22 and that insulated totes may be stored at storage locations without environmental control functionality.

The system 10 includes the warehouse control system 16, which comprises a computer for controlling the operation of the system 10, including directing storage, decant, and order fulfilment operations of goods within the facility. The microclimate control devices 22 are each independently addressable by the warehouse control system 16 and are each operable to adjust or regulate the microclimate in the interior of the tote 12 sealed by the corresponding tote cover 21. That is, control system 16 is operable for use in monitoring and controlling the microclimate of each tote 12 by the given storage location for the tote 12, with system 10 being able to control the microclimate based on the known contents of the tote 12 by system 10. The microclimate control devices 22 are provided for regulating and adjusting the environmental conditions within the tote 12, such as for adjusting the temperature, humidity, and gas levels (e.g. oxygen or ethylene concentrations) within the tote 12, such as for preserving freshness of frozen goods or the ripeness of produce, for example. Because each microclimate control device 22 is individually addressable and controllable, a particular microclimate control device 22 may be disabled, such as if a non-insulated, non-environmentally controlled tote is stored at that storage location, for example. Preferably, in order to most-efficiently utilize resources and available storage volumes within the system 10, the warehouse control system 16 may only direct insulated totes 12 to storage locations having tote covers 21 and microclimate control devices 22 such that non-insulated totes are prioritized for use at any non-environmentally controlled storage locations. Such prioritization of non-insulated totes at non-environmentally controlled storage locations may be particularly advantages due to the inherently smaller internal storage volume of insulated totes caused by the insulation factor of insulated totes. The microclimate control devices 22 may comprise a thermoelectric cooling device, such as a heat pump or the like, and may include one or more sensors for monitoring the environmental conditions of the interior of the tote 12, such as a temperature sensor, humidity sensor and/or oxygen level sensor.

The system 10 includes environmental control inputs, which may be provided throughout the ASRS 14 to provide inputs to the microclimate control devices 22 and thereby the totes 12 stored at storage locations in the ASRS 14. For example, the communication network 18 distributed throughout the ASRS 14 may include data interfaces at each microclimate control device 22. A power interface is provided along with the data interface to provide electricity inputs to the microclimate control device 22 to energize its microclimate control system. The system 10 may include an environmental control input in the form of a fluid distribution system 26, such as an air/gas delivery network, for delivering fluids to be input into the totes 12 via the microclimate control device 22. As shown in the illustrated embodiment of FIG. 2, the fluid distribution system 26 comprises piping or tubing to provide air and/or gas to the totes 12 vial the covers 21. The fluid distribution system 26 may connect to the microclimate control device 22, with each of the devices 22 communicatively coupled with the communication network 18 for controlling of the devices 22, including controlling of the fluid distribution system 26. For example, a tote 12 containing fresh bananas may require additional ethylene gas to aid in ripening the bananas and the ethylene gas may be transported via the fluid delivery network 26 and input into a tote 12 stored at a storage location and sealed by the tote cover 21. The environmental control inputs may utilize thermoelectric pumps, forced ventilation, vapor-compression refrigeration, refrigerants, gas control mechanisms, and the like to supply required inputs to the microclimate control devices 22 and totes 12 based on the requirements of the facility and the goods stored therein. Because the microclimate control device 22 and the environmental control inputs are stationary within the ASRS 14 at the corresponding storage locations, the microclimate control device 22 and/or the tote 12 do not require robust shock protection for protecting sensitive electronics or sensors.

The warehouse control system 16 is operable to monitor and maintain or adjust the environmental conditions of each of the totes 12 independently based on information received via the communication network 18 from the corresponding microclimate control device 22. In other words, the warehouse control system 16 is operable to monitor and maintain or adjust the environment conditions of each of the totes 12 at different levels. The environmental conditions within a tote 12 are only addressable and adjustable by the warehouse control system 16 while they are stored at a storage location in the ASRS 14 and sealed by a tote cover 21 such that their microclimates may only be monitored and/or adjusted while stored and sealed. In other words, as a tote 12 is traveling or in motion within the system 10, it is de-coupled from environmental control of the microclimate control device 22 such that the data interface, power interface, and the fluid delivery system are unable to input into the totes 12. The totes 12 may include wireless sensors or monitoring devices such that each tote 12 is operable to monitor its environmental conditions when de-coupled from the tote cover 21. The totes may be any commonly known and commercially available receptacle for use with an automated storage and retrieval system and the lid is configured to fit the specified receptacle type. The totes 12 may be stored at any of the storage locations and be sealed by any of the tote covers 21 within the system. Preferably, each of the totes 12 has an insulated body to moderate the temperature within the tote.

The warehouse control system 16 is operable to control and direct order fulfilment operations of inventory goods from the ASRS 14 to an order fulfilment workstation. For example, for orders requiring goods stored in two or more of the totes 12 in the ASRS 14, the warehouse control system 16 may direct the system 10 to hold all of the totes 12 containing required goods for that order within the ASRS 14 until an order container is or multiple containers (if necessary) are available at the order fulfilment workstation to accommodate all of the required goods for that order. Optionally, the automated warehouse system 10 may include a buffer to store totes 12 temporarily either once they have been released from the ASRS 14 or after they have been filled and released from a decant workstation. The communication network 18 is connected to the buffer and the environmental control inputs may also be connected to the buffer to provide inputs to totes 12 held in the buffer. The buffer may be configured similar to the ASRS 14, such as at a smaller scale, for example. For example, the buffer includes buffer storage locations for receiving and storing totes 12, a buffer receptacle cover attached to the buffer at each one of the buffer storage locations, and a buffer microclimate control device at each buffer receptacle cover. The warehouse control system 16 may direct the system 10 to hold one or more totes 12 containing required goods for a particular order at the buffer until an order container or multiple containers are available at the order fulfilment workstation to accommodate all of the required goods for that order.

Referring now to the illustrative embodiment of FIG. 3, the method 100 is provided for controlling microclimates inside of individual storage receptacles or totes 12 within an automated warehouse system 10 having a warehouse control system 16. The method includes storing 102 goods (e.g. frozen and fresh foods) in totes 12 that are stored in an ASRS 14. The totes 12 may be commonly known and commercially available receptacles and the ASRS 14 includes lids or covers 21 at each storage location, which are sized and dimensioned to receive the totes 12. Each cover 21 is formed to fit the particular type of receptacle utilized within the system 10. Each cover 21 includes a microclimate control device 22. The covers 21 and microclimate control devices 22 provide an environmental control input interface at each storage location within the ASRS 14 to provide inputs to the totes 12 stored therein. The system 10 is operable to regulate or adjust one or more environmental conditions within the totes 12, including temperature, humidity, and/or gas levels. When a tote 12 arrives at a storage location, the method includes sealing 104 the tote 12 with the corresponding cover 21. The warehouse control system 16 monitors 106 the environmental conditions within each tote 12. Each microclimate control device 22 is individually addressable via the communication network 18 such that each totes stored and sealed with a cover 21 may be monitored and regulated independent of other totes in the ASRS 14. If a particular one of the totes 12 requires adjustment of its environmental conditions, the warehouse control system 16 directs or controls 108 the microclimate control device 22 corresponding to that particular tote 12 to adjust the microclimate environmental conditions to meet the requirements of the goods stored within that particular tote 12.

Although covers 21 with microclimate control devices 22 are shown in FIGS. 1 and 3 in connection with a storage rack 20 of an ASRS 14, it should be appreciated that covers 21 and control devices 22 may be employed with alternative racks 20 having storage locations for totes 12, including separate from an ASRS. For example, rather than fixed racks 20 of an ASRS 14, an alternative rack such as a moveable rack or buffer rack configured generally as arranged with regard to storage rack 20 may be employed in which the alternative rack includes covers 21 with microclimate control devices 22 at storage locations of the alternative rack for totes 12. In such a configuration, the covers 21 may be supported at the storage locations of the alternative rack, either in a moveable manner to engage totes 12 or for sliding engagement with a tote 12. Such an alternative rack may be used, for example, if totes 12 that were removed from ASRS 14 require re-cooling.

The method 100 may also include directing 110 order fulfilment operations within the automated warehouse system 10 to hold one or more of the totes 12 containing goods for a particular order at a buffer until an order container is, or containers are, available at the order fulfilment workstation to accommodate all of the required goods for that order. Once the order container is, or containers are, available the warehouse control system 16 directs 112 the buffer and, if necessary, the ASRS 14, to release all of the totes 12 with required goods to the workstation for the order fulfilment processing. In the event that the microclimate-control functions of the automated warehouse system 10 were to fail or be interrupted, the totes 12 may be systematically removed from storage in a manner that prioritizes removal of the most perishable or fragile goods from the ASRS 14 first. Thus, the goods are maintained at adequate or ideal environmental conditions for as long as possible while present in the automated warehouse system 10.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. An automated warehouse system for storage of goods at different temperatures and having a warehouse control system controlling said system, said system comprising:
   an automated storage and retrieval system comprising a storage rack defining a plurality of storage locations;
   a plurality of storage receptacles configured to be stored at storage locations in said storage rack;
   a storage receptacle cover coupled to said storage rack at at least some of said storage locations, wherein each of said receptacle covers is selectively operable to cover an open portion of one of said storage receptacles present at a particular one of said storage locations;
   a microclimate control device coupled with each of said receptacle covers and operable to monitor and regulate environmental conditions within one of said storage receptacles covered by a corresponding one of said receptacle covers, wherein each of said microclimate control devices are individually addressable by the warehouse control system;
   wherein the warehouse control system is operable to control each of said microclimate control devices to maintain and adjust the environmental conditions of corresponding ones of said storage receptacles stored in said rack such that the environmental conditions of storage receptacles covered with one of said receptacle covers can be maintained and adjusted at different levels.

2. The automated warehouse system of claim 1, further comprising a communication network disposed throughout said automated storage and retrieval system and in communication with each of said microclimate control devices at each of said storage locations, and wherein the warehouse control system is operable to adjust the environmental conditions of each of said storage receptacles via a connection between said communication network and each of said microclimate control devices.

3. The automated warehouse system of claim 1, wherein at least some of said storage receptacles comprise an insulated body.

4. The automated warehouse system of claim 1, wherein said automated warehouse system is located in an ambient environment.

5. The automated warehouse system of claim 1, wherein at least some of said receptacle covers are operable to raise and lower relative to one of said storage receptacles stored at a corresponding storage location to cover and uncover an opening at an upper portion of one of said storage receptacles at said corresponding storage location.

6. The automated warehouse system of claim 1, wherein at least some of said receptacle covers are configured to slideably receive one of said storage receptacles and wherein said storage receptacles move laterally to be slideably received in one of said receptacle covers to be stored at a corresponding one of said storage locations.

7. The automated warehouse system of claim 1, wherein said automated storage and retrieval system comprises one chosen from an aisle based storage system and a carousel based storage system.

8. The automated warehouse system of claim 1, wherein each of said microclimate control devices is operable to control at least one chosen from temperature, humidity, and gas levels within a corresponding one of said storage receptacles when said storage receptacle is covered by said receptacle cover.

9. The automated warehouse system of claim 2, wherein each of said microclimate control devices is operable to monitor and regulate the environmental conditions of a corresponding storage receptacle when that storage receptacle is covered by one of said receptacle covers.

10. The automated warehouse system of claim 1, wherein the warehouse control system is operable to direct decant operations of inbound goods into storage receptacles in a manner that provides a storage receptacle or receptacles for decanting having adequate storage volume available to receive an entirety of an inbound case of goods such that the entirety of the goods are stored at identical environmental conditions within the same one or ones of said storage receptacles.

11. The automated warehouse system of claim 1, wherein the warehouse control system is operable to direct order fulfilment operations of goods stored in two or more of said storage receptacles in a manner that holds all of said storage receptacles containing required goods for a particular order until an order container or containers are available at an order fulfilment workstation to accommodate all of the required goods for that particular order.

12. The automated warehouse system of claim 2, further comprising a buffer rack having a plurality of buffer storage locations, a buffer receptacle cover coupled to said buffer rack at each one of said buffer storage locations, and a buffer microclimate control device at said buffer receptacle cover of each of said buffer storage locations, said buffer rack configured to store a plurality of said storage receptacles either once they have been released from said automated storage and retrieval system or after a decant operation, wherein said communication network comprises a portion disposed throughout said buffer, wherein the warehouse control system is operable to direct order fulfilment operations in a manner that holds at least some of said storage receptacles containing required goods for a particular order at said buffer until an order container or containers are available at an order fulfilment workstation to accommodate all of the required goods for that particular order.

13. A storage rack for storage of goods at different temperatures and having a control system comprises:
    a storage rack defining a plurality of storage locations;

a plurality of storage receptacles configured to be stored at storage locations in said storage rack;

a storage receptacle cover coupled to said storage rack at at least some of said storage locations, wherein each of said receptacle covers is selectively operable to cover an open portion of one of said storage receptacles present at a particular one of said storage locations;

a microclimate control device coupled with each of said receptacle covers and operable to monitor and regulate environmental conditions within one of said storage receptacles covered by a corresponding one of said receptacle covers, wherein each of said microclimate control devices are individually addressable by the control system;

wherein the control system is operable to control each of said microclimate control devices to maintain and adjust the environmental conditions of corresponding ones of said storage receptacles stored in said rack such that the environmental conditions of storage receptacles covered with one of said receptacle covers can be maintained and adjusted at different levels.

14. A method for controlling microclimates inside of individual storage receptacles within an automated warehouse system having a warehouse control system, said method comprising:

storing a plurality of storage receptacles in an automated storage and retrieval system having a plurality of storage locations, a receptacle cover coupled to the automated storage and retrieval system at at least some of the storage locations and configured to cover a storage receptacle at the corresponding one of the storage locations, and a microclimate control device at each of the receptacle covers, each microclimate control device is operable to monitor and regulate environmental conditions within the corresponding storage receptacle;

covering storage receptacles with respective receptacle covers at storage locations when the storage receptacles arrive at the particular storage locations;

monitoring the environmental conditions within each of the storage receptacles with the warehouse control system, which is operable to individually address each of the microclimate control devices via a communication network disposed throughout the automated storage and retrieval system;

regulating the environmental conditions within particular ones of the storage receptacles if the storage receptacles require adjustment of their respective environmental conditions based on said monitoring to meet the requirements of the goods stored within that storage receptacle; and uncovering selected storage receptacles with the receptacle covers at the particular storage locations when the selected storage receptacles are to be removed from the particular storage location.

15. The method of claim 14, further comprising directing order fulfilment operations within the automated warehouse system with the warehouse control system in a manner that holds all of the storage receptacles containing required goods for a particular order until an order container or containers are available at an order fulfilment workstation to accommodate all of the required goods for that particular order, and once the order container or containers are available, directing the automated storage and retrieval system to release all of the required storage receptacles to the workstation.

16. The method of claim 14, further comprising directing order fulfilment operations within the automated warehouse system with the warehouse control system in a manner that holds at least some of the storage receptacles containing required goods for a particular order at a buffer of the automated warehouse system until an order container or containers are available at an order fulfilment workstation to accommodate all of the required goods for that particular order, and once the order container or containers are available, directing the buffer and, if necessary, the automated storage and retrieval system, to release all of the required storage receptacles to the workstation.

17. The method of claim 14, wherein each of the microclimate control devices is operable to control at least one chosen from temperature, humidity, and gas levels within the corresponding storage receptacle.

18. The method of claim 15, wherein each of the microclimate control devices is operable to monitor and regulate the environmental conditions of a corresponding storage receptacle when that storage receptacle is sealed by one of the receptacle covers.

19. The method of claim 15, further comprising decanting inbound goods that require environmental control into an insulated tote and transferring the insulated tote to the automated storage and retrieval system, wherein said storing a plurality of storage receptacles in an automated storage and retrieval system comprises storage the insulated tote at a storage location of the automated storage and retrieval system having a receptacle cover and microclimate control device.

20. The method of claim 19, further comprising decanting inbound goods that do not require environmental control into a non-insulated tote and transferring the non-insulated tote to the automated storage and retrieval system, wherein said storing a plurality of storage receptacles in an automated storage and retrieval system comprises storing the non-insulated tote at a storage location of the automated storage and retrieval system without a receptacle cover or microclimate control device.

* * * * *